3,017,375
Patented Jan. 16, 1962

3,017,375
METHOD OF FOAM SUPPRESSION IN OIL-IN-WATER EMULSIONS BY USE OF SOLVENT SOLUTION OF LIQUID POLYVINYL ISOBUTYL ETHER
Harvey T. Gehring, Chicago, Ill., assignor to The Sherwin-Williams Company, Cleveland, Ohio, a corporation of Ohio
No Drawing. Filed Jan. 6, 1958, Ser. No. 707,115
11 Claims. (Cl. 260—22)

This invention relates to a method of prevention of foam formation in the manufacture of water-containing emulsion paints having included therein as a part of the emulsion paint system a surface active agent.

More particularly, this invention is directed to the suppression of foam in emulsion paints containing a polymeric material held in an oil-in-water emulsified state through the use of a surface active agent which comprises including in said water and surface active agent containing emulsion paint a quantity of polymeric polyvinyl isobutyl ether.

Commercial acceptance of water base paints within the last decade has been extremely rapid. The reasons for this are manifold but among them are the ease of application to wall surfaces, rapid drying of the material to a water resistant film, easy cleaning of the equipment necessary for application of paints of this quality, and fundamentally, a freedom from fire hazards when paints of this quality are warehoused and stored.

The water base paints of commerce at the present time usually comprise prime pigments to provide the necessary hiding quality, inert pigments to give the essential pigment volume relationship providing the degree of specular reflection desired, surface active agents which provide wetting of the surface over which the paints are to be applied and aid in the dispersion of pigments in the aqueous systems as well as to provide means for emulsification of the non-volatile polymeric binders which serve as adhesives or glues to hold the pigments to the surfaces over which the water based paints are applied. As most of the water based paints of today contain film-forming emulsion polymer latexes, it is also practice to include in paints of this quality protective colloids. Protective colloids in general are organic substances which when dispersed in water in relatively small quantities, cause a relatively large increase in viscosity of the aqueous medium. They serve primarily to prevent breakdown of paint emulsion systems during their manufacture, storage, and application. Most often these materials are aqueous alkaline dispersions of proteins, including illustratively casein and vegetable protein, although a large number of water dispersible colloids, including the water soluble modified celluloses, water soluble or dispersible resins, etc., which are employed for this purpose. More recently water soluble salts of high molecular weight polymers have been found useful. Sodium polyacrylate is illustrative of this class of protective colloid. Very often oil-modified alkyds, heat bodied drying oils and other materials, which may be generally classed as oleoresinous varnishes, are used in conjunction with film-forming polymer latexes in compounding the binder phase of emulsion paint systems.

As is apparent from the foregoing general description of the ingredients which make up the present-day water base paints, they are of an extremely heterogeneous nature. One of the troublesome problems inherent in the manufacture and use of water base paints containing surface active agents is the excessive tendency of the formulation to foam, due primarily to the presence of surface active agents and the high degree of shear to which these materials must be subjected to produce the homogeneity essential to uniformity in the final film both during and after application and drying of the emulsion paint products. Foam formation presents a number of undesirable aspects. One is in the manufacture of the paint product itself. With foam formation the volume of manufacturing tank cannot be efficiently used in producing a similar volume of paint. In filling out of the paint after manufacture, difficulty in filling the can to the standard weight per gallon of the material is experienced. In use of the water containing paint by the ultimate consumer, the presence of foam causes pin-holding, cratering and other undesirable surface aberrations leading to an unpleasant appearance of the surface decorated with the paint coating.

This invention is directed primarily to emulsion paints formulated with film-forming polymer latices including the styrene-butadiene type emulsion interpolymers. This invention is also useful in paints formulated from polyvinyl acetate homopolymers and copolymers including vinyl acetate-vinyl acrylate types, oil-modified alkyd emulsions and water containing paints wherein the binder phase is a colloidal dispersion of water soluble resins, for example, sodium polyacrylate. In paints of the above described class, the problem of foam is not particularly related to the quality of the non-volatile binder phase selected and used as the dispersed phase. The problem of foam formation is aggravated by the presence of surface active agents and particularly so when the pH of the film-forming polymer latex is on the alkaline side, for example, from pH 7.5 to about 9.5. The presence of the surface active agents has thus far been found inherently essential to the successful storage and application of water based finishes for both protective and decorative use.

The prior art has essayed to overcome the inherent defect of foam in water base paints containing surface active agents by the use of a variety of antifoam agents, including sulfonated tallow, high molecular weight alcohols, pine oil, etc., but all of the aforesaid agents are for one or more reasons limited in their effectiveness.

It is the principal object of this invention to provide a means of preventing foam formation in water base paints containing, as one essential component, a surface active agent.

Another object is to provide a readily available, relatively inexpensive antifoam agent which can be used in small amount and yet suppress foam development during manufacture, filling and use of coating compositions whose major volatile component is water.

Other advantages accrue through the use of the particular antifoam agent useful for the purposes of this invention. However, the suppression of foam is the primary object of the method and the composition hereinafter more fully described and claimed.

The amounts of polyvinyl isobutyl ether essential for the ends of this invention are extremely small and amounts of 2# per 100 gallons of completed water base paint have been demonstrated to control foam formation. However, it is preferred to employ slightly larger amounts of polyvinyl isobutyl ether in the range of from 5# per 100 gallons to 10# per 100 gallons of emulsion paint product to not only suppress foam formation but contribute other valuable characteristics and qualities to the final emulsion paint products. In some instances, polyvinyl isobutyl ether is known to contribute plasticizing qualities to other film-forming components present in the binder phase of the paint and to aid in increasing the washability (soap and water resistance as well as abrasion resistance) of paint films containing the small percentages of additive described. In other instances, prevention of the formation of blisters in the final coating and enhanced water resistance of the paint film after application and drying have been materially improved through use of the quantities of polyvinyl isobutyl ether set out above.

Addition of the polyvinyl isobutyl ether is preferably carried out by solubilizing the liquid polymeric polyvinyl isobutyl ether in pine oil or other convenient solvent, for example, toluene, xylene and other volatile hydrocarbons of both aliphatic and aromatic nature, including cyclohexane, etc. The range of numerical molecular weights of the polyvinyl isobutyl ethers suitable for the purposes of this invention has not been determined. It is known that the molecular weight should not be so advanced that the polymeric material at 100% non-volatile is a solid. It may be polymerized to the extent that it is a relatively viscous liquid at 100% non-volatile. Thus, the terms "liquid polyvinyl isobutyl ether" and "low molecular weight polyvinyl isobutyl ether" as used herein are alternate terms of reference. In any event, the molecular weight is less than 200,000 units, and the fact that the polyvinyl isobutyl ether is a liquid indicates a molecular weight considerably below the figure named. The following example illustrates a manufacture of polyvinyl isobutyl ether useful for the ends of this invention. The parts are by weight unless otherwise noted in the examples which follow. Examples 3 through 5F illustrate completed emulsion paint formulations bulking about 100 gallons.

Example 1

Into a jacketed reaction vessel fitted with a cover, condenser and agitator are charged 197 parts of xylene and 197 parts of vinyl isobutyl ether. Under good agitation 0.03 to 0.06 part of a boron trifluoride ethyl-ethyl complex are added, or alternatively, one may meter in boron trifluoride as a gas at a temperature not above 80° F. Resort to cooling below 20° F. has not been found necessary. An exothermic reaction takes place and the reaction is relatively rapid, the temperature increasing to a maximum of 250° F. The temperature of the reaction is controlled through cooling water in the jacketed vessel. After the first exotherm has been passed, the temperature of the reactants is cooled to about 100° F., whereupon an additional 197 parts of monomeric vinyl isobutyl ether are incorporated into the first reaction mass and additional catalyst of the class described above admitted to the reaction zone. A second exotherm carries the temperature to 250 to 260° F. at which temperature the mass is held by directing cooling liquid through the jacket. The temperature is held at about 250 to 260° F. until a test of a small portion of the liquid shows 60% of the components thereof to be non-volatile at 250° F. Usually the time required for the complete polymerization reaction wanted is of the order of 3 to 4 hours.

For ease in handling 165 parts of pine oil and ¼ part of ditertiary amyl hydrocumene are incorporated into the polymeric material. The non-volatile portion of the resulting polymer is liquid in nature and the polymerization is not carried to a point where all flow characteristics of the polymer have been lost. The liquid polymeric material resulting from the above reaction is ideally suited for use as an antifoam in the manufacture of water base paints containing a surface active agent, illustrative formulations of which follow:

Example 2

In a steam jacketed kettle equipped with agitator containing 155 parts of cold water, are added the following: 55 pounds of a soya bean ortho protein. The protein is allowed to become wetted with the water over about a 15 minute period during which time the agitator is turned on and steam is admitted to the jacket to bring the temperature of the protein-water slurry to about 175 to 180° F. In a separate vessel 3½ parts of caustic soda are dissolved in 27 parts cold water. When the temperature of the protein dispersion in the steam jacketed kettle reaches 175 to 180° F. the aqueous alkaline solution is added as rapidly as possible to the protein slurry. Immediately thereafter 6 parts of sodium orthophenyl phenate and 6 parts of sodium pentachlorophenate along with 6 parts of an inorganic, salt-free sodium dodecyl benzene sulfonic acid and 6 parts of a formaldehyde condensation product of sodium salt of naphthalene sulfonic acid are incorporated in the aqueous protein dispersion. Up to 20 parts of the material of Example 1 have been used to suppress the formation of foam at this point in the manufacture of the protein dispersion. More has not been found necessary. In the manufacture of the protein solution it is preferred to use only that quantity of the composition of Example 1 essential to control foam formation during the manufacture of the aqueous colloidal dispersion of the protein.

Example 3

Into a second jacketed tank equipped with an agitator is pumped 33 parts of water and 192 parts of the protein solution described in Example 1. Two parts of tetrasodium pyrophosphate are added to the aqueous protein mixture prior to the addition of the following pigments. The pigments are added in the amounts and in the order given, while subjecting the aqueous protein solution to constant agitation. 250 parts of titanium dioxide, 40 parts of mica, 60 parts of china clay, 30 parts of diatomaceous earth and 30 parts of calcium carbonate. When the pigment has been thoroughly wetted, there is added additionally 45 parts of a 90% linseed oil modified alkyd comprising linseed oil, pentaerythritol and maleic anhydride. The alkyd is cooked to an acid value of 5 to 7, a viscosity of from 6 to 9 in the Gardner-Holdt tube and a cure from 60 to 80 seconds. One part of 24 percent lead naphthenate and 3 parts of 6 percent cobalt naphthenate are incorporated, either with the long oil linseed alkyd or as a separate addition. 1–20 parts of a pine oil-polyvinyl isobutyl ether solution (as prepared in Example 1) are added at this point to arrest foam formation. After the long oil alkyd varnish has been thoroughly incorporated into the protein-pigment-water dispersion the entire mix is passed through a colloid mill to assure freedom from undispersed particles and agglomerates. While it is not essential, it is preferred to heat the material to approximately 150° F. Thereafter 290 parts of a 50 percent solids styrene-butadiene emulsion film-forming polymer latex containing 66 percent styrene and 34 percent butadiene (interpolymerized) are stirred into the freshly ground pigment-protein-oil dispersion. The above paint is used as a standard latex emulsion paint for purposes of illustrating and evaluating the various aspects of the invention.

Example 4

A second base latex emulsion paint was made, the same as in Example 3, but the oil modified alkyd resin was omitted, substituting an equal volume of a similar styrene-butadiene film-forming polymer latex as described in Example 2 for the volume of oil omitted.

Example 5

10 parts of product of Example 1
140 parts of water
2¼ parts of sodium salt of the condensation product of naphthalene sulfonic acid and formaldehyde
4 parts of the sodium salt of an alkyl aryl sulfonic acid (Nacconal NRSF)
50 parts of lithopone
240 parts of titanium dioxide
20 parts of water ground mica
35 parts of calcium carbonate
15 parts diatomaceous earth
50 parts kaolin
1 part of carboxymethyl cellulose were thoroughly mixed together and the resulting pigment pastes were freed of macroscopic particles by passage through a zone of high shear (Hy-R speed mill).

Paints were prepared from the above described pigment dispersion in the following way:

To 295 parts of the pigment dispersion were added 95 parts of aqueous protective colloid solutions containing two parts of the following protective collids and pigment binders.

*Example 5A*

Sodium polyacrylate.

*Example 5B*

Sodium carboxymethyl cellulose.

*Example 5C*

Hydroxyethyl cellulose.

*Example 5D*

Polyvinyl alcohol.

*Example 5E*

Sodium alginate.

*Example 5F*

4,000 cps. methyl cellulose.

195 parts of a variety of commercially available film-forming polymer latices of 45–50% non-volatile content were stirred into each of the prepared pigment bases in accordance with the following notations:

Example 5A—An acrylic latex (Rohm and Haas as described in U.S. 2,795,564)
Example 5B—A styrene-butadiene latex (Dow Chemical latex 762–W)
Example 5C—An acrylonitrile-styrene-2 ethyl hexyl acrylate-methacrylic acid latex (Monsanto, as described in U.S. Patent 2,767,153), Lytrom 680
Example 5D—A homopolymer of vinyl acetate
Example 5E—A vinyl acetate-dibutyl maleate (85:15 ratio) interpolymer latex
Example 5F—A vinyl acetate-dibutyl maleate ethyl acrylate terpolymer latex (90.5:5 ratio)

Each of the above samples was stirred vigorously and set aside for test brush outs. None of the films resulting from brush out tests exhibited surface defects commonly traceable to foam formation demonstrating the foam suppressing qualities of low molecular weight polyvinyl isobutyl ether.

Having thus described my invention, what I claim is:

1. A method of suppressing foam formation in the manufacture of oil-in-water film-forming polymer latex containing emulsion paints which comprises including in said composition during its compounding and intermixing an amount within the range of from two to ten pounds per hundred gallons of completed paint product of a non-volatile liquid polyvinyl isobutyl ether having a molecular weight less than 200,000 in solution in a volatile organic solvent therefor.

2. A foam-free, oil-in-water emulsion coating composition comprising a polymeric solid film forming binder as the principal disperse phase, a surface active agent as the emulsifier for said disperse phase and an antifoaming agent comprising a liquid polyvinyl isobutyl ether having a molecular weight less than 200,000 dissolved in a volatile organic solvent therefor; the amount of the polyvinyl isobutyl ether polymer added to said emulsion paint product sufficient to arrest foam formation, said amount being within the range of from about 2 to about 10 lbs. of said polymer solids per 100 gallons of the completed emulsion paint product.

3. A foam-free, oil-in-water emulsion coating composition comprising a polymeric solid film forming binder as the principal disperse phase, a surface active agent as the emulsifier for said disperse phase and an antifoaming agent comprising a liquid polyvinyl isobutyl ether dissolved in a volatile organic solvent therefor; the amount of the polyvinyl isobutyl ether polymer added to said emulsion paint product sufficient to arrest foam formation, said amount being within the range of from about 2 to about 10 lbs. of said polymer solids per 100 gallons of the completed emulsion paint product.

4. The product of claim 2 wherein the polymeric solid film-forming binder constituting the principal disperse phase is a polymer latex.

5. The product of claim 4 wherein the polymer latex is an emulsion copolymer of styrene and butadiene.

6. The product of claim 4 wherein the polymer latex is an acrylic latex.

7. The product of claim 4 wherein the polymer latex is a homopolymer of vinyl acetate.

8. The product of claim 2 wherein the polymeric solid film-forming binder constituting the disperse phase is a drying oil modified alkyd resin.

9. The product of claim 2 wherein the polymeric solid film-forming disperse phase is a copolymer of vinyl acetate and dibutyl maleate.

10. The product of claim 4 wherein the polymer latex is a terpolymer of vinyl acetate dibutyl maleate and ethyl acrylate.

11. A method of suppressing foam formation in an emulsion coating composition of the oil-in-water class comprising water, a surface active agent and a polymeric solid film-forming binder as the principal disperse phase which comprises adding to the aqueous components during agitation and dispersion of the components thereof an amount of an antifoaming agent comprising a liquid polyvinyl isobutyl ether having a molecular weight less than 200,000 dissolved in a volatile organic solvent therefor, sufficient to arrest foam formation said amount within the range of from about 2 to about 10 lbs. of said polyvinyl isobutyl ether solids per 100 gallons of completed emulsion paint product.

References Cited in the file of this patent

UNITED STATES PATENTS

| | | |
|---|---|---|
| 1,931,325 | Pillsbury | Oct. 17, 1933 |
| 2,481,100 | Fox | Sept. 6, 1949 |
| 2,786,821 | Gardner | Mar. 26, 1957 |

FOREIGN PATENTS

| | | |
|---|---|---|
| 500,872 | Great Britain | Feb. 13, 1939 |
| 737,158 | Great Britain | Sept. 21, 1955 |
| 759,427 | Great Britain | Oct. 17, 1956 |
| 885,178 | France | May 17, 1943 |
| 705,104 | Germany | Apr. 17, 1941 |
| 50,141 | Holland | Apr. 15, 1941 |

UNITED STATES PATENT OFFICE
CERTIFICATE OF CORRECTION

Patent No. 3,017,375 January 16, 1962

Harvey T. Gehring

It is hereby certified that error appears in the above numbered patent requiring correction and that the said Letters Patent should read as corrected below.

Column 3, line 31, for "ethyl-ethyl" read -- ether-ethyl --.

Signed and sealed this 15th day of May 1962.

(SEAL)
Attest:

ERNEST W. SWIDER
Attesting Officer

DAVID L. LADD
Commissioner of Patents